United States Patent [19]

Tsuji

[11] Patent Number: 5,094,546

[45] Date of Patent: Mar. 10, 1992

[54] IC TEMPERATURE SENSOR WITH REFERENCE VOLTAGES SUPPLIED TO TRANSISTOR BASES

[75] Inventor: Takahiro Tsuji, Osaka, Japan

[73] Assignee: Ricoh Company, Ltd., Tokyo, Japan

[21] Appl. No.: 623,206

[22] Filed: Dec. 6, 1990

[30] Foreign Application Priority Data

Jan. 9, 1990 [JP] Japan .................... 1-1793

[51] Int. Cl.⁵ .................... G01K 7/00; H01L 31/00
[52] U.S. Cl. .................... 374/178; 374/163; 307/310
[58] Field of Search ............ 307/310; 374/163, 171, 374/173, 178, 183, 185

[56] References Cited

U.S. PATENT DOCUMENTS

| | | | |
|---|---|---|---|
| 3,758,791 | 9/1973 | Taniguchi et al. | 307/310 X |
| 3,809,929 | 5/1974 | Vittoz | 307/310 |
| 4,021,722 | 5/1977 | Crowle | 374/178 X |
| 4,071,813 | 1/1978 | Dobkin | 374/178 X |
| 4,497,586 | 2/1985 | Nelson | 374/163 |
| 4,574,205 | 3/1986 | Nagano | 307/310 |
| 4,625,128 | 11/1986 | Boeckmann | 374/178 X |
| 4,652,144 | 3/1987 | Günther et al. | 374/178 |

Primary Examiner—William A. Cuchlinski, Jr.
Assistant Examiner—G. Bradley Bennett
Attorney, Agent, or Firm—Cooper & Dunham

[57] ABSTRACT

An IC temperature sensor has a reference voltage circuit for providing a reference voltages; a voltage comparing circuit provided with first and second input transistors constructed such that a ratio of sizes of emitters of the first and second input transistors is set to a predetermined ratio; a device for inputting outputs from the reference voltage circuit to the base of the input transistors; a device for providing a predetermined potential for the other input transistor; and a device for outputting a voltage signal proportional to temperature with the difference in size between the emitters of the input transistors.

4 Claims, 3 Drawing Sheets

IC TEMPERATURE SENSOR WITH REFERENCE VOLTAGES SUPPLIED TO TRANSISTOR BASES

BACKGROUND OF THE INVENTION

1. Field of the Invention

The present invention relates to an IC temperature sensor for detecting the temperature of an IC chip in a semiconductor integrated circuit (which is called IC in the following description), a power IC for audio, an IC for motor control, etc.

2. Description of the Related Art

A general IC temperature sensor has a simple, but there is about 10% dispersion in temperature coefficient with respect to an obtained voltage in a worst case because of dispersion on in element characteristics.

Japanese Patent Application Laying Open (KOKAI) No. 61-118630 shows a circuit in which the dispersion in element characteristics is considered. However, this circuit has the disadvantage that its output this circuit is changed by a change in the power voltage.

Further, there is a circuit in which there is a difference between the sizes of input transistors to cause a difference in voltage between a base and an emitter of each of the input transistors, thereby obtaining an electric current proportional to temperature. However, this circuit has the disadvantage that it cannot be easily used since its output is provided as an electric current.

SUMMARY OF THE INVENTION

It is therefore an object of the present invention to provide an IC temperature sensor for reducing the influence of dispersion in element characteristics and having a preferable accuracy.

The above object of the present invention can be achieved by an IC temperature sensor comprising a reference voltage circuit for providing reference voltages; a voltage comparing circuit provided with first and second input transistors construted such that the ratio of sizes of emitters of the first and second input transistors is set to a predetermined ratio; means for inputting an output from the reference voltage circuit to at least one of the input transistors; means for providing a predetermined potential for the other input transistor; and means for outputting a voltage signal proportional to temperature in accordance with the difference in size between the emitters of the input transistors.

In the above structure, an output of the reference voltage circuit is inputted to the voltage comparing circuit and a differential voltage is obtained from the difference in size between the first and second input transistors so that an output of the temperature sensor is obtained on the basis of the differential voltage. It is possible to provide a temperature sensor having a good accuracy irrespective of dispersion in element characteristics at a physically determined value by holding an accuracy in output from the reference voltage circuit. Further, a desirable output can be obtained by changing a resistance value and the above size ratio as necessary.

Further objects and advantages of the present invention will be apparent from the following description of the preferred embodiments of the present invention as illustrated in the accompanying drawings.

DESCRIPTION OF THE PREFERRED EMBODIMENTS

The preferred embodiments of an IC temperature sensor in the present invention will next be described in detail with reference to the accompanying drawings.

Figure 1:
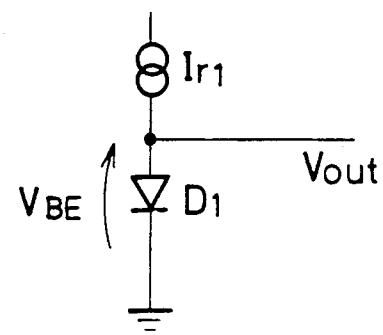
FIGS. 1 to 3 are circuit diagrams respectively showing general IC temperature sensors.

FIG. 1 shows a general IC temperature sensor. In FIG. 1, reference numerals $Ir_1$ and $D_1$ respectively designate a constant electric current source and a diode. The circuit shown in FIG. 1 uses temperature characteristics about $-2$ mV/°C. with respect to a voltage $V_{BE}$ between an anode and a cathode of the diode $D_1$. A voltage proportional to temperature is detected from a connection point between the constant electric current source $Ir_1$ and the diode $D_1$.

This circuit can be constructed very simply, but there is about 10% dispersion in temperature coefficient in a worst case because of dispersion in element characteristics.

Figure 2:
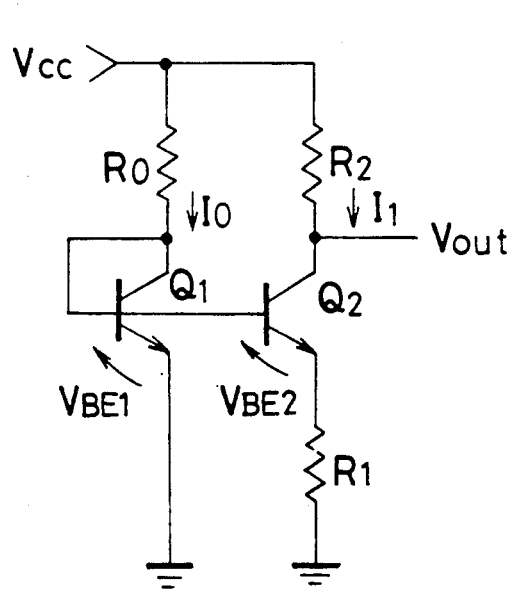

Japanese Patent Application Laying Open (KOKAI) No. 61-118630 shows a circuit in which the dispersion in element characteristics is considered. As shown in FIG. 2, the circuit of this kind has a transistor $Q_1$ short-circuited between a base and a collector thereof, and a transistor $Q_2$ having a base connected to the base of this transistor $Q_1$. A voltage $V_{cc}$ is applied to the respective collectors of the transistors $Q_1$ and $Q_2$ through resistors $R_0$ and $R_2$. An emitter of the transistor $Q_2$ is connected to ground through the resistor $R_1$. A voltage in accordance with the temperature of the chip is obtained from the collector of the transistor $Q_2$.

The circuit shown in FIG. 2 uses the results of the following formula (1) with respect to an output voltage $V_{out}$.

$$V_{OUT} = V_{CC} - I_1 \cdot R_2 = V_{CC} - (V_{BE1} - V_{BE2})R_2/R_1 \quad (1)$$

The following results can be obtained from the above formula (1).

$$V_{BE1} - V_{BE2} = \frac{KT}{q} \ln \frac{I_0}{I_S} - \frac{KT}{q} \ln \frac{I_1}{I_S} = \frac{KT}{q} \ln \frac{I_0}{I_1} \quad (2)$$

In the above formula (2), reference numerals K, q, Is, and T respectively designate a Boltzmann constant, an electronic charge, a reverse direction saturation current of a transistor, and an absolute temperature.

As mentioned above, the accuracy of the circuit shown in FIG. 2 is not reduced by the saturation current Is.

However, the circuit shown in FIG. 2 has the disadvantage that the output voltage $V_{out}$ is changed when the voltage $V_{cc}$ is changed.

Figure 3:
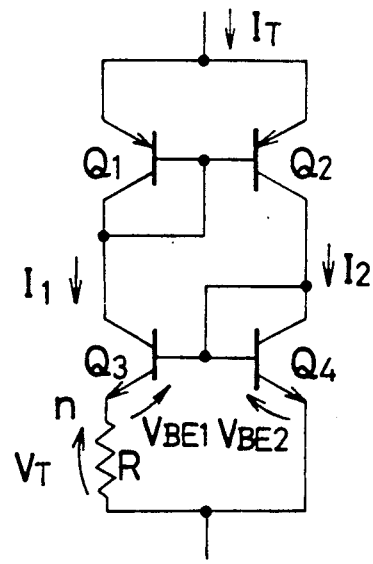

FIG. 3 shows a circuit structure in which there is a difference between the sizes of input transistors to cause a difference in voltage between a base and an emitter of each of the input transistors, thereby obtaining an electric current proportional to temperature. Namely, in FIG. 3, a transistor $Q_1$ has a collector and a base short-circuited therebetween and the base of this transistor $Q_1$ is connected to a base of a transistor $Q_2$. An electric current $I_T$ is supplied to emitters of the transistors $Q_1$ and $Q_2$. The collector of the transistor $Q_1$ is connected to a collector of a transistor $Q_3$. A transistor $Q_4$ has a base and a collector short-circuited therebetween and the collector of the transistor $Q_4$ is connected to a collector of the transistor $Q_2$. The bases of the transistors $Q_3$ and $Q_4$ are connected to each other. An emitter of the transistor $Q_3$ is connected to that of the transistor $Q_4$ through a resistor R. The emitter of the transistor $Q_3$ has an area n-times that of the emitter of the transistor $Q_4$ where n is a positive integer.

In the circuit shown in FIG. 3, a voltage $V_T$ is provided as follows.

$$V_T = V_{BE1} - V_{BE2} = \frac{KT}{q} \ln \frac{I_2}{I_1} = \frac{KT}{q} \ln \frac{nI_2}{I_2} = \frac{KT}{q} \ln n \quad (3)$$

Here, the electric current $I_T$ is provided as follows.

$$I_T = I_1 + I_2 + 2I_1 (\because I_1 = I_2)$$

Further, from the formula (3), an electric current $I_1$ is provided as follows.

$$I_1 = \frac{V_T}{R} = \frac{KT}{qR} \ln n$$

Accordingly, from these formulas, the electric current $I_T$ is represented as follows.

$$I_T = 2KT/qR \ln n$$

Therefore, an entire electric current flowing through this circuit is proportional to temperature.

However, the output of this circuit is an electric current so that it is necessary to additionally dispose a circuit for converting the electric current to a voltage.

As mentioned above, the circuit shown in FIG. 2 has the disadvantage that the output voltage of this circuit is changed by the change in voltage $V_{cc}$. Further, the circuit shown in FIG. 3 has the disadvantage that it cannot be easily used since its output is an electric current.

An IC temperature sensor in accordance with each embodiment of the present invention will next be described with reference to FIGS. 4 to 7.

Figure 4:
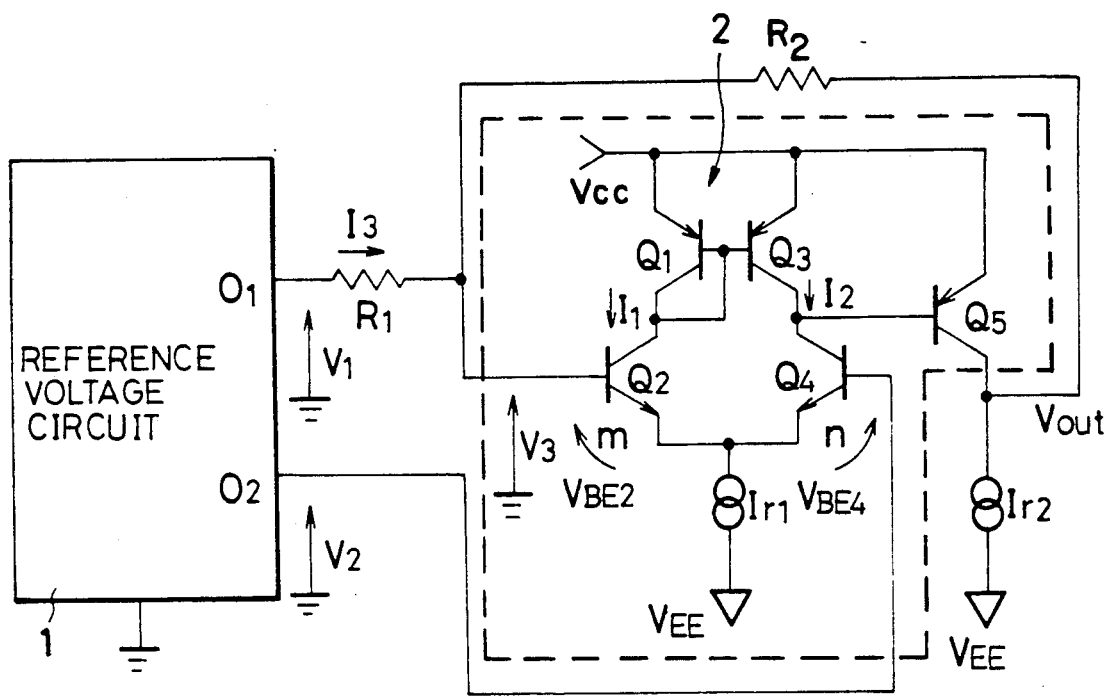
FIG. 4 is a circuit diagram showing the basic construction of an IC temperature sensor in the present invention.

FIG. 4 is a circuit diagram showing the basic construction of an IC temperature sensor in one embodiment of the present invention.

In the present invention, the IC temperature sensor has a reference voltage circuit 1 having two output portions. One output portion $O_1$ of this reference voltage circuit 1 is connected to one end of a resistor $R_1$. The other end of this resistor $R_1$ is connected to a resistor $R_2$ and a base of a transistor $Q_2$ as a first input transistor of a differential amplifying circuit 2. An emitter of the transistor $Q_2$ is connected to one end of a constant electric current source $I_{r1}$ and an emitter of a transistor $Q_4$ as a second input transistor. The other end of the constant electric current source $I_{r1}$ is connected to a circuit portion having a lowest potential $V_{EE}$. A collector of the transistor $Q_2$ is connected to a collector and a base of the transistor $Q_1$ and a base of a transistor $Q_3$. A collector of the transistor $Q_3$ is connected to a collector of the transistor $Q_4$ and a base of the transistor $Q_5$. Further, emitters of the respective transistors $Q_1$, $Q_3$ and $Q_5$ are connected to a power source having a voltage $V_{cc}$. A collector of the transistor $Q_5$ is connected to one end of a constant electric current source $I_{r2}$ and a resistor $R_2$. The other end of the constant electric current source $I_{r2}$ is connected to the circuit portion having potential $V_{EE}$. The other output portion of the reference voltage circuit 1 is connected to a base of the transistor $Q_4$.

The transistors $Q_1$ and $Q_3$ constitute a current mirror and collector currents $I_1$ and $I_2$ thereof are equal to each other.

A ratio of the sizes of the emitters of the transistors $Q_2$ and $Q_4$ is set to m:n. Reference numeral $V_{BE2}$ designates a voltage between the base and the emitter of the transistor $Q_2$. Reference numeral $V_{BE4}$ designates a voltage between the base and the emitter of the transistor $Q_4$. In this case, difference $\Delta V_{BE}$ between the voltages $V_{BE2}$ and $V_{BE4}$ is provided as follows.

$$\Delta V_{BE} = V_{BE2} - V_{BE4} = \frac{KT}{q} \ln \frac{I_1}{m \cdot I_{s1}} - \frac{KT}{q} \ln \frac{I_2}{n \cdot I_{s2}} \quad (5)$$

$$= \frac{KT}{q} \ln \frac{nI_1 \cdot I_{s2}}{m \cdot I_2 \cdot I_{s1}}$$

$$= \frac{KT}{q} \ln \frac{nI_{s2}}{mI_{s1}}$$

In the above formula (5) reference numerals $I_{s1}$ and $I_{s2}$ respectively designate a reverse direction saturation current of transistor $Q_2$ and a reverse direction saturation current of transistor $Q_4$.

The electric current $I_{s1}$ is approximately equal to the electric current $I_{s2}$ within an integrated circuit.

Here, it is considered that a base potential $V_2$ of the transistor $Q_4$ is determined by a reference voltage source so that no change in temperature of this base potential is caused. In this case, a base potential $V_3$ of the transistor $Q_2$ is provided as follows from the formula (5).

$$V_3 = V_2 - V_{BE4} + V_{BE2} \quad (6)$$

$$= V_2 + \Delta V_{BE}$$

$$= V_2 + \frac{KT}{q} \ln \frac{n \cdot I_{s2}}{m \cdot I_{s1}}$$

An output voltage $V_{OUT}$ can be represented as follows from the formula (6) when an electric current flowing through the base of the transistor $Q_2$ with respect to an electric current $I_3$ flowing through the resistor $R_1$ is neglected.

$$V_{OUT} = V_1 - (R_1 + R_2) I_3 \quad (7)$$

$$= V_1 - \frac{R_1 + R_2}{R_1} (V_1 - V_3)$$

$$= V_1 - \frac{R_1 + R_2}{R_1} \left\{ V_1 - \left( V_2 + \frac{KT}{q} \ln \frac{n \cdot I_{s2}}{m \cdot I_{s1}} \right) \right\}$$

If the voltages $V_1$ and $V_2$ can be accurately provided, dispersions with respect to $$\frac{R_1 - R_2}{R_1} \text{ and } \frac{KT}{q} \ln \frac{n \cdot I_{s2}}{m \cdot I_{s1}}$$

can be respectively reduced and set to about ±3% and ±2 mV in the case of an integrated circuit so that a temperature sensor having high accuracy can be obtained.

Further, the above ratio m:n of the transistors, the voltages $V_1$, $V_2$ and the resistors $R_1$, $R_2$ can be freely changed as necessary and the power voltage has no influence.

Figure 5:
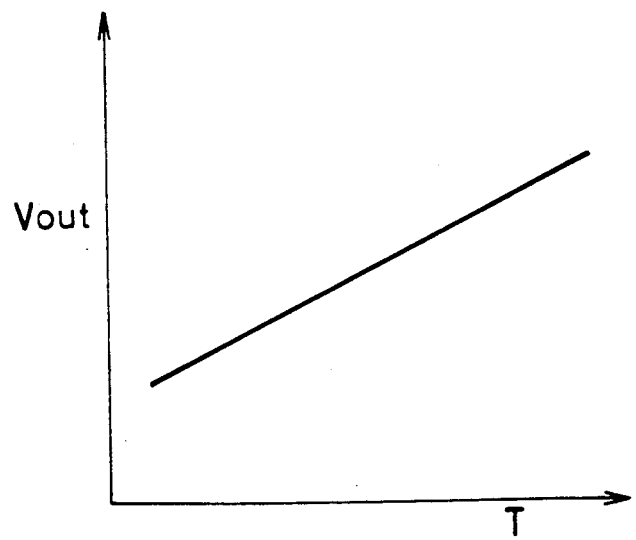
FIG. 5 is a characteristic graph showing the relation between temperature and output voltage of the circuit shown in FIG. 4.

Values $R_1 + R_2/R_1$ and $n \cdot I_{s2}/m \cdot I_{s1}$ do not depend on temperature. Accordingly, the output voltage $V_{out}$ is linearly changed with respect to temperature from the formula (7) so that the relation between the output voltage and temperature is represented by a straight line having a positive inclination as shown by FIG. 5.

Figure 6:
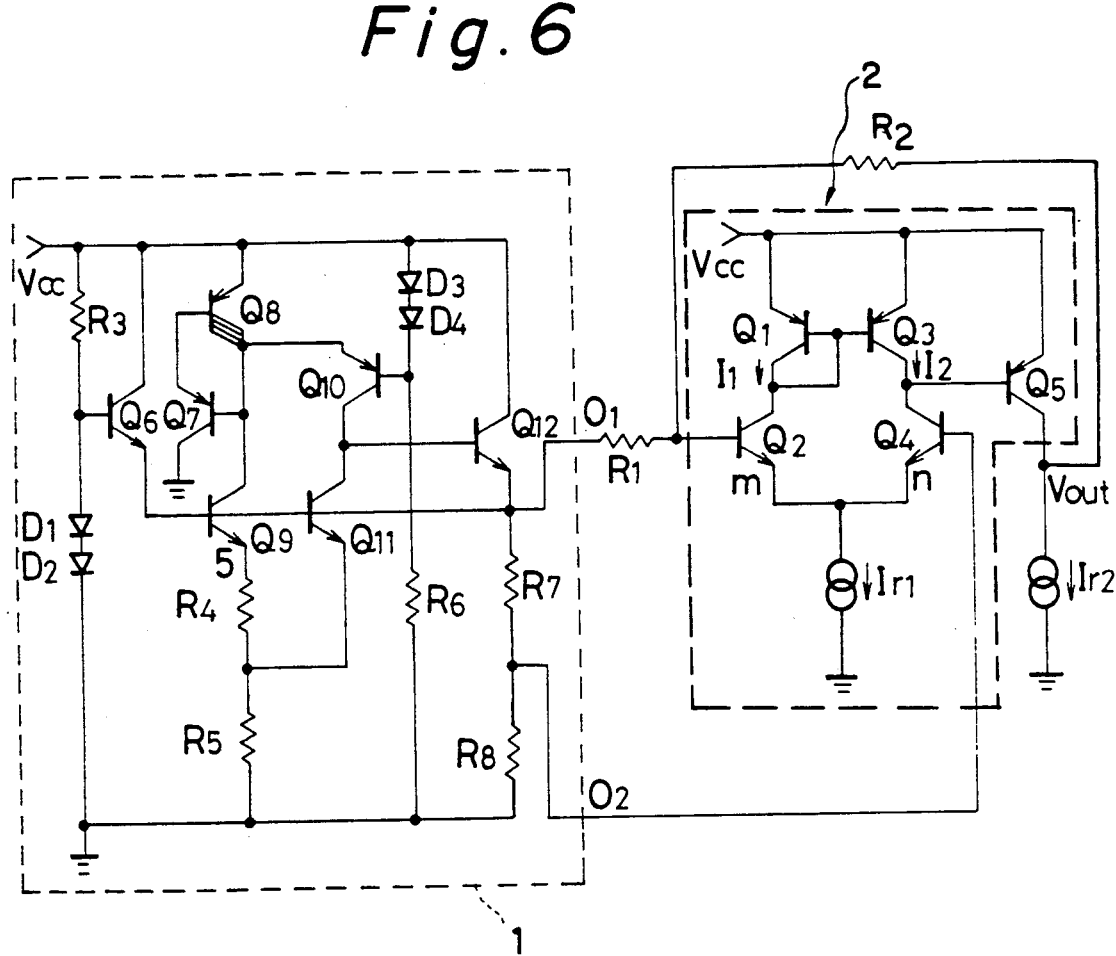
FIG. 6 is a circuit diagram showing an IC temperature sensor in accordance with one embodiment of the present invention.

FIG. 6 shows an IC temperature sensor in one concrete embodiment of the present invention. In FIG. 6, the reference voltage circuit 1 shown in FIG. 4 is constructed by a band gap reference circuit. In this reference voltage circuit 1, a power source having a voltage Vcc is connected to ground through a resistor $R_3$ and diodes $D_1$ and $D_2$. A voltage between this resistor $R_3$ and the diode $D_1$ is supplied to a base of a transistor $Q_6$. A collector of the transistor $Q_6$ is connected to the power source having voltage $V_{cc}$. An emitter of this transistor $Q_6$ is connected to bases of transistor $Q_9$ and $Q_{11}$ and an emitter of a transistor $Q_{12}$. A collector of the transistor $Q_9$ is connected to a collector of a transistor $Q_8$ and a base of a transistor $Q_7$. A collector of this transistor $Q_7$ is connected to the ground. An emitter of the transistor $Q_9$ is connected to the ground through resistors $R_4$ and $R_5$. An output voltage partially divided by the resistors $R_4$ and $R_5$ is supplied to an emitter of a transistor $Q_{11}$. An emitter of the transistor $Q_8$ is connected to the power source having voltage $V_{cc}$. The collector of the transistor $Q_8$ is connected to an emitter of a transistor $Q_{10}$. A collector of this transistor $Q_{10}$ is connected to a collector of the transistor $Q_{11}$. Further, the collector of the transistor $Q_{11}$ is connected to a base of a transistor $Q_{12}$. A base of the transistor $Q_{10}$ is connected to the power source having voltage $V_{cc}$ through diodes $D_3$ and $D_4$ and is connected to the ground through a resistor $R_6$. An emitter output of the transistor $Q_{12}$ is provided as a first output $O_1$. The emitter of the transistor $Q_{12}$ is connected to the ground through resistors $R_7$ and $R_8$. An output divided by these resistors $R_7$ and $R_8$ is provided as a second output $O_2$.

As is well known, the above circuit is constructed such that a voltage about 1.2 V is output as the first output $O_1$. In this case, the change in output $O_1$ caused by the change in power voltage, the change in temperature, etc. is reduced and set to about several ten mV. Further, when the second output $O_2$ is set to an output divided by the above resistors $R_7$ and $R_8$, the change in second output $O_2$ can be reduced and set to a voltage $R_7/R_7 + R_8$ times the change in first output $O_1$.

Figure 7:
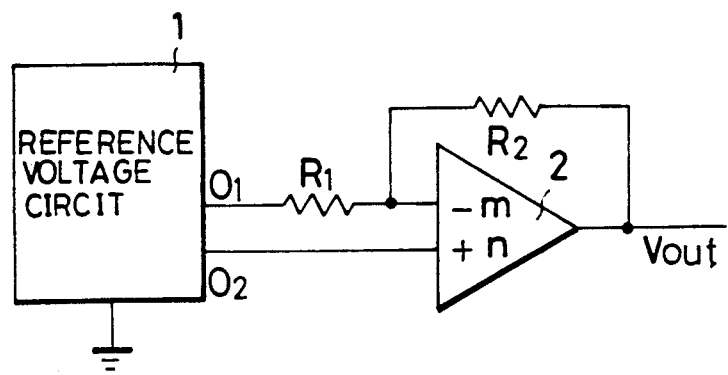
FIG. 7 is a circuit diagram showing an IC temperature sensor in accordance with another embodiment of the present invention.

Instead of the above structure, the first and second outputs $O_1$ and $O_2$ of the reference voltage circuit can be the same and the voltages $V_1$ and $V_2$ in FIG. 4 can be set equal to each other. Further, it is possible to construct each of the transistors $Q_2$ and $Q_4$ shown in FIG. 4 in an input portion of the temperature sensor by a PNP transistor instead of an NPN transistor. These circuits can be generally constructed by the circuit shown in FIG. 7. In FIG. 7, one output $O_1$ from the reference voltage circuit 1 having two outputs is inputted to a negative terminal "−" of a differential amplifying circuit 2 through a resistor $R_1$. The other output $O_2$ of the reference voltage circuit 1 is inputted to a positive terminal "+" of the differential amplifying circuit 2. An output voltage $V_{out}$ of the differential amplifying circuit 2 is connected to the negative input terminal "−" through a resistor $R_2$ to perform negative feedback.

In the present invention, the ratio of the sizes of first and second input transistors of this differential amplifying circuit 2 is set to a predetermined ratio.

The present invention can be also applied to a temperature sensor providing an output changed at a certain temperature by connecting a comparator to an output section of the temperature sensor.

In accordance with the present invention, it is possible to provide a temperature sensor having a good accuracy since influences of the change in power voltage and dispersion in element characteristics are reduced. Further, all constructional elements can be disposed within an integrated circuit so that no circuit added to the exterior of the temperature sensor is required and space can be effectively utilized in the entire system.

Many widely different embodiments of the present invention may be constructed without departing from the spirit and scope of the present invention. It should be understood that the present invention is not limited to the specific embodiments described in the specification, except as defined in the appended claims.

What is claimed is:

1. An IC temperature sensor comprising:
   a differential amplifying circuit having a first input transistor and a second input transistor, a ratio of sizes of emitters of said first input transistor and said second input transistor being set to a predetermined ratio;
   a reference voltage circuit for respectively supplying a first reference voltage to a base of said first input transistor and a second reference voltage to a base of said second input transistor such that electric currents flow through the emitters of said first input transistor and said second input transistor; and
   means for outputting a signal in accordance with a change in temperature by an output voltage generated in said differential amplifying circuit on the basis of said first reference voltage, said second reference voltage, a voltage between the base and the emitter of said first input transistor, a voltage between the base and the emitter of said second input transistor and the predetermined ratio of the sizes of the emitters of said first input transistor and said second input transistor.

2. An IC temperature sensor according to claim 1, in which said reference voltage circuit has two outputs for supplying said first and second reference voltages and said first reference voltage is supplied to said first input transistor through a first resistor.

3. An IC temperature sensor according to claim 1, in which an output of said differential amplifying circuit is feedback-connected to said first input transistor through a second resistor.

4. An IC temperature sensor according to claim 1, in which said output voltage is substantially linearly related to temperature throughout a range of voltage values including the lowest potential in the sensor circuit.

* * * * *

UNITED STATES PATENT AND TRADEMARK OFFICE
CERTIFICATE OF CORRECTION

PATENT NO. : 5,094,546

DATED : March 10, 1992

INVENTOR(S) : Takahiro Tsuji

It is certified that error appears in the above-identified patent and that said Letters Patent is hereby corrected as shown below:

Title page, left-hand column, at item "[30]", "1-1793" should read --2-1793--.

Signed and Sealed this

Twentieth Day of July, 1993

Attest:

MICHAEL K. KIRK

*Attesting Officer*     *Acting Commissioner of Patents and Trademarks*